United States Patent
Müller et al.

(10) Patent No.: US 10,357,993 B2
(45) Date of Patent: Jul. 23, 2019

(54) WHEEL FOR A MOTOR VEHICLE

(71) Applicant: BBS Motorsport GmbH, Haslach im Kinzigtal (DE)

(72) Inventors: Roman Müller, Lahr (DE); Thorsten Welte, Hausach (DE)

(73) Assignee: BBS MOTORSPORT GMBH, Haslach im Kinzigtal (DE)

( * ) Notice: Subject to any disclaimer, the term of this patent is extended or adjusted under 35 U.S.C. 154(b) by 0 days.

(21) Appl. No.: 14/944,451

(22) Filed: Nov. 18, 2015

(65) Prior Publication Data
US 2017/0136811 A1 May 18, 2017

(51) Int. Cl.
*B60B 1/06* (2006.01)
*B60B 3/00* (2006.01)
*B60B 1/08* (2006.01)
*B60B 1/12* (2006.01)
*B60B 3/10* (2006.01)
*B60B 1/10* (2006.01)
*B60B 5/02* (2006.01)
*B60B 1/02* (2006.01)
*B60B 3/02* (2006.01)

(52) U.S. Cl.
CPC .............. *B60B 1/06* (2013.01); *B60B 1/08* (2013.01); *B60B 1/10* (2013.01); *B60B 1/12* (2013.01); *B60B 3/005* (2013.01); *B60B 3/007* (2013.01); *B60B 3/10* (2013.01); *B60B 1/0261* (2013.01); *B60B 3/02* (2013.01); *B60B 5/02* (2013.01); *B60B 2360/104* (2013.01); *B60B 2360/106* (2013.01); *B60B 2360/341* (2013.01); *B60B 2900/112* (2013.01); *B60B 2900/311* (2013.01)

(58) Field of Classification Search
CPC .... B60B 3/10; B60B 1/06; B60B 1/08; B60B 1/10; B60B 1/12; B60B 1/0261; B60B 1/0269; B60B 3/007; B60B 3/005
See application file for complete search history.

(56) References Cited

U.S. PATENT DOCUMENTS

| 6,428,116 | B1 * | 8/2002 | Chou ................. | B60B 1/003 |
| | | | | 301/104 |
| D708,109 | S * | 7/2014 | Hodges ............... | D12/205 |
| D780,657 | S * | 3/2017 | Welte ................. | D12/211 |
| D780,658 | S * | 3/2017 | Welte ................. | D12/211 |
| D832,176 | S * | 10/2018 | Chung ................ | D12/209 |

(Continued)

FOREIGN PATENT DOCUMENTS

| CN | 2614949 Y * | 5/2004 | .............. B60B 3/12 |
| DE | 10146972 | 4/2003 | |
| DE | 10146972 A1 * | 4/2003 | .............. B60B 1/08 |

(Continued)

Primary Examiner — Jason R Bellinger
Assistant Examiner — Scott A Browne
(74) Attorney, Agent, or Firm — Rankin, Hill & Clark LLP

(57) ABSTRACT

A wheel for a motor vehicle comprises a rim having an outer radius and a wheel spider including a radially inner hub and a plurality of spokes extending from said hub towards said rim. At least one through-hole extends, with respect to the wheel axis, in a circumferential direction through at least one of said spokes. A radially outer edge of said through-hole or of an outermost of said through-holes is located at maximum at 75%, preferably at maximum at ⅔, of said outer radius of the rim measured at a wheel spider side of the rim.

14 Claims, 4 Drawing Sheets

(56) References Cited

U.S. PATENT DOCUMENTS

2011/0241415 A1* 10/2011 Mikura ................ B60B 1/08
                                                301/64.102
2014/0246895 A1*  9/2014 Mueller ............... B60B 1/14
                                                301/11.1

FOREIGN PATENT DOCUMENTS

| DE | 10146972 A1 | * | 4/2003 | ............ B60B 1/08 |
|----|-------------|---|--------|------------------------|
| FR | 2904789 A1  | * | 2/2008 | ............ B60B 1/08 |
| JP | 2012040903 A | * | 3/2012 | ............ B60B 1/08 |
| JP | 2012040903 A | * | 3/2012 | ............ B60B 1/08 |

* cited by examiner

WHEEL FOR A MOTOR VEHICLE

BACKGROUND OF THE INVENTION

The present invention relates to a wheel for a motor vehicle, said wheel having a wheel axis and comprising a rim having an outer radius and a wheel spider, said wheel spider including a radially inner hub and a plurality of spokes extending from said hub towards said rim, at least one through-hole extending, with respect to the wheel axis, in a circumferential direction through at least one of said spokes.

From published German patent application DE 101 46 972 A1 a wheel is known in which the through-hole extends substantially over the entire length of the spokes, i.e. from the close vicinity of the hub to the close vicinity of the rim. However, it turned out that this concept could not be put into practice. It was even considered to be unworkable.

SUMMARY OF THE INVENTION

In view of the above, it is the object of the present invention to further develop the above-discussed concept such that it may be put into practice.

This object is solved by a wheel for a motor vehicle, said wheel having a wheel axis and comprising a rim having an outer radius and a wheel spider, said wheel spider including a radially inner hub and a plurality of spokes extending from said hub towards said rim, at least one through-hole extending, with respect to the wheel axis, in a circumferential direction through at least one of said spokes, wherein a radially outer edge of said through-hole or of an outermost of said through-holes is located at maximum at 75%, preferably at maximum at ⅔, of said outer radius of said rim measured at a wheel spider side of said rim. Accordingly, the mechanical stability and strength of the spokes at their radially outer end sections where they tend, due to design reasons, to be thinner as at their respective radially inner end sections is not jeopardized by through-holes or through-hole sections. In contrast, the radially inner sections of the spokes are strong enough to allow the provision of through-holes without putting the structural strength and the load-carrying capacity of the spoke at risk.

Providing at least one through-hole in the spokes of the wheel has the advantage that heat energy generated by a braking action close to the wheel hub and spreading via the spokes towards the rim and thus the tire may not affect the tire material and the airtightness of the so-called bead seating. In general, the introduction of heat energy generated by a braking action into the wheel is not detrimental. With today's high performance brake systems for heavy and fast vehicles an introduction of the heat energy into the wheel is often even desired, in order to effectively dissipate and transfer the heat energy to the environment. However, this must not be achieved at the cost of putting the tire material and the airtightness of the bead seating at risk. In this context, the at least one through hole, on the one hand, provides a resistance to the heat flow from the hub to the rim and, on the other hand, provides an enlarged contact surface for heat exchange between the wheel, in particular the spokes, and the ambient air. Both effects contribute to protecting the bead seating and the tire material from overheating.

According to a further embodiment, at least one of said spokes may have a branched shape, said branched shape having a branch point or knot point and at least two webs extending from said knot point towards at least one of said rim and said hub, at least one web extending from said knot point to the respective other of said rim and said hub. Therefore, as used herein, the term "branch point" or "knot point" means an intersection of the at least two webs of the at least one spoke.

According to a first alternative of this further embodiment, the branched shape may be a X-shape, said X-shape having a branch or knot point, two inner webs extending from the knot point towards the hub, and two outer webs extending from the knot point towards the rim. And, according to a second alternative of this further embodiment, the branched shape may be a Y-shape, said Y-shape having a branch or knot point, an inner web extending from the knot point towards the hub and two outer webs extending from the knot point towards the rim.

As compared to conventional radial spokes, branched spokes according to these embodiments have the advantage of increased mechanical strength.

In order to further increase the mechanical strength of the spokes, it is suggested that the knot point is located at between about 30% and about 60% of the outer radius of the rim.

According to a further embodiment of the branched shape spoke concept, in at least one spoke having a branched shape at least one through-hole is formed in at least one web, preferably in all webs, extending from said knot point towards said hub. The at least one knot point-to-hub through-hole may preferably extend over at least 75% of the length of the respective knot point-to-hub web.

In addition or as an alternative, in at least one spoke having a branched shape, at least one through-hole is formed in at least one web, preferably in all webs, extending from said knot point towards said rim. The at least one knot point-to-rim through-hole may preferably be located in close vicinity to the respective knot point. In particular, the distance between the knot point and a radially inner edge of the knot point-to-rim through-hole may be less than 10% of the length of the knot point-to-rim web.

It should be noted that in a case in which a through hole is provided in both, a knot point-to-hub web and a knot point-to-rim web of a spoke having a branched shape, the knot point enhances the mechanical stability of the spoke by shortening the free lengths of the spoke sections extending, with respect to the wheel axis, axially above and below the through-holes.

According to a further embodiment, it is suggested that the maximum extension of said at least one through-hole in the direction of the wheel axis amounts to between about 20% and about 60% of the corresponding extension of the corresponding spoke, in order to ensure sufficient mechanical stability of the spoke sections extending, with respect to the wheel axis, axially above and below the through-holes.

In this context, it is furthermore advantageous that the at least one through-hole is located along the neutral fiber of the spoke. In particular, it is advantageous that the radial outer edge of the knot point-to rim webs is located on the neutral fiber of the spoke.

With respect to the shape of the at least one knot point-to-hub through-hole, it should be noted that the at least one knot point-to-hub through-hole may be configured according to a substantially rectangular or trapezoidal shape having rounded corners. In particular, the radially outer corner and the radially inner corners may be rounded independently from each other.

With respect to the shape of the at least one knot point-to-rim through-hole, it should be noted that at least one through-hole provided in a web extending from said knot point towards said rim is configured according to a substantially oval shape. In particular, the oval shape may have a rounded radially outer edge and a rounded radially inner edge, the radially inner edge being formed wider than the radially outer edge.

According to a further embodiment, a surface of at least one spoke facing an adjacent spoke in a circumferential direction with respect to the wheel axis is at least partially formed with an undercut. Preferably, at least one through-hole opens into said undercut.

If the spoke is configured according to a branched shape, it is preferred if only those surfaces facing an adjacent spoke in a circumferential direction with respect to the wheel axis are at least partially formed with an undercut. Accordingly, those surfaces of the webs facing an adjacent web of the same spoke are free of any undercut. Accordingly, all webs of a X-shaped spoke and the two radially outer webs of a Y-shaped spoke have a substantially C-shaped cross-section, whereas the radially inner web of a Y-shaped spoke has a substantially H-shaped (or double-T-shaped) cross-section, both cross-sections providing mechanical strength at reduced use of material.

According to a further embodiment, said rim and said wheel spider are integrally formed. For example, the wheel including said hub, said spokes and said rim may be made from a light metal or a light metal alloy, the light metal being at least one of aluminum and magnesium.

According to an alternative embodiment, however, the wheel may be a hybrid wheel, said rim and said wheel spider being made from different materials. In this case, the wheel spider may, in addition to the hub and the spokes, furthermore include an outer ring connecting the free ends of the spokes. For example, the rim may be made from fiber-reinforced plastics material, the matrix material being e.g. a thermoplastic material or a thermoset material, and the fibers being e.g. carbon fibers. Moreover, the wheel spider may be made from a light metal or a light metal alloy, the light metal being at least one of aluminum and magnesium.

In the context with hybrid wheels, the improved energy dissipation provided by the at least one through-hole is of particular importance, as due to the different thermal expansion coefficients of the different materials of wheel spider and rim there is a risk of inhomogeneous expansion and the generation of mechanical stress in the components of the wheel, when being heated as a result of a breaking action. Whereas a wheel spider made from metal may show a considerable thermal expansion, in particular up to the order of 1 mm, the rim made from fiber-reinforced plastics may show no substantial thermal expansion.

It is to be added that the integral wheel or the wheel spider of the hybrid wheel, respectively, preferably may be made from a forged metal material. It is, however, also conceivable to apply the inventive concepts to a wheel made from a cast metal material.

In the case of an integral wheel or a wheel spider of a hybrid wheel made from a forged metal material the at least one through-hole may be made using at least one of the following techniques: drilling, milling, laser cutting, laser ablation, eroding and water jet cutting. In the case of an integral wheel or a wheel spider of a hybrid wheel made from a cast metal material the at least one through-hole may be made using a core, in particular a lost core, an insertion element or complex casting tool.

Furthermore, it is suggested that the rim and the wheel spider of the hybrid wheel are fixed to each other by means of a clamping ring. The clamping ring may, for example, be fixed by a plurality of bolts, e.g. screw bolts, to that component, i.e. rim or wheel spider, which is made from a metal material.

As an alternative to the use of a clamping ring, the rim and the wheel spider of the hybrid wheel may be directly screwed to each other.

It is to be added that the wheel may be adapted to be locked to a wheel carrier of the motor vehicle either by a plurality of fastening bolts or by a center lock assembly. Furthermore, the wheel may have up to ten spokes.

Referring to a wheel having X- or Y-shaped spokes, it should be noted that the angular distance of adjacent radially outer webs associated with the same spoke may be different from the angular distance of adjacent radially outer webs associated with adjacent spokes. In particular, the angular distance of adjacent radially outer webs associated with the same spoke may be larger than the angular distance of adjacent radially outer webs associated with adjacent spokes, the ratio between the two angular distances preferably amounting to less than 1.25.

BRIEF DESCRIPTION OF THE DRAWINGS

Further features and advantages of the invention will become apparent from the following description illustrating a preferred embodiment of the present invention with reference to schematic drawings, in which.

DETAILED DESCRIPTION OF THE INVENTION

Figure 1:
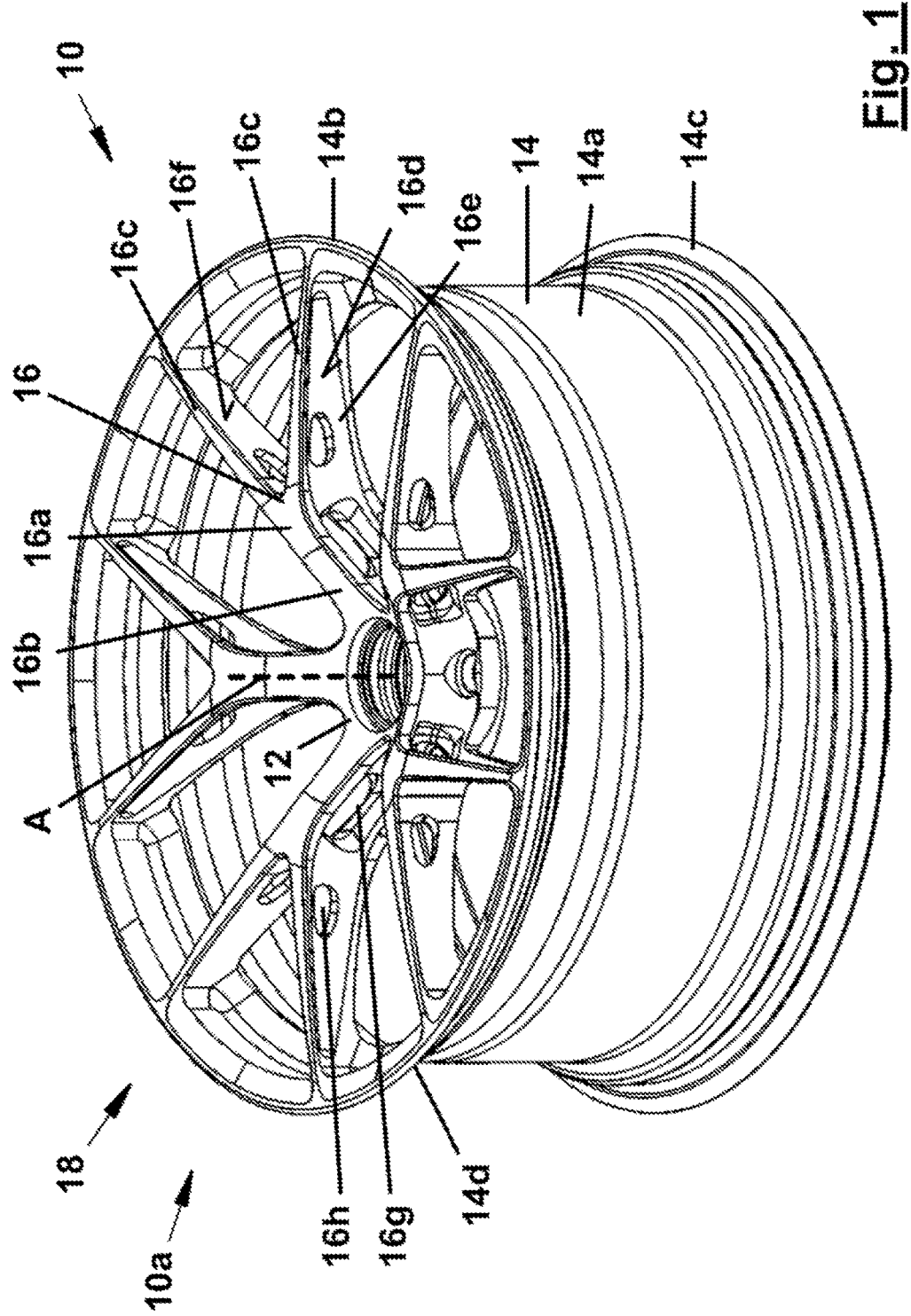
FIG. 1 is a perspective view of a wheel according to the invention.
Figure 2:
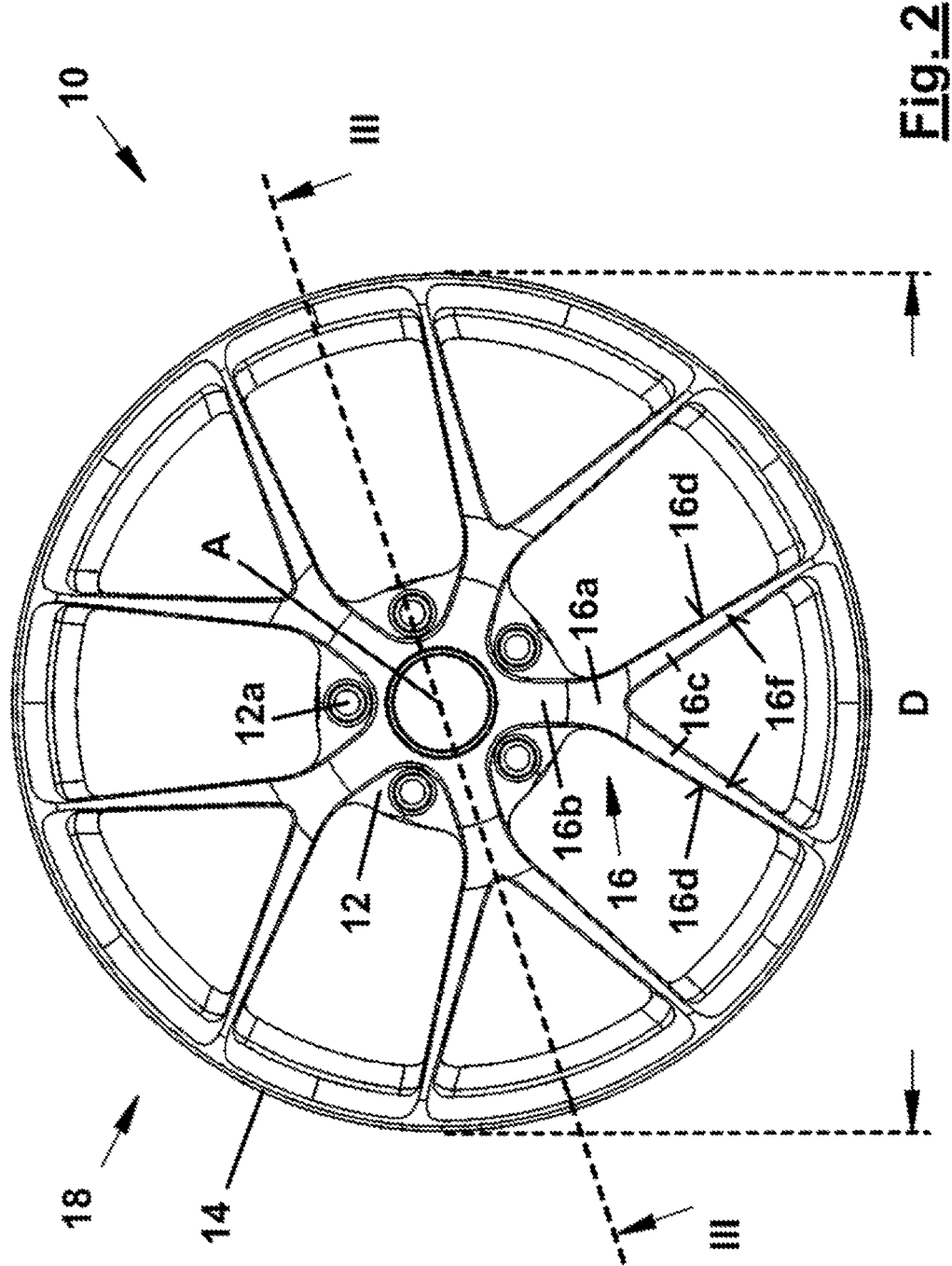
FIG. 2 is a plan view of the wheel of FIG. 1.
Figure 3:
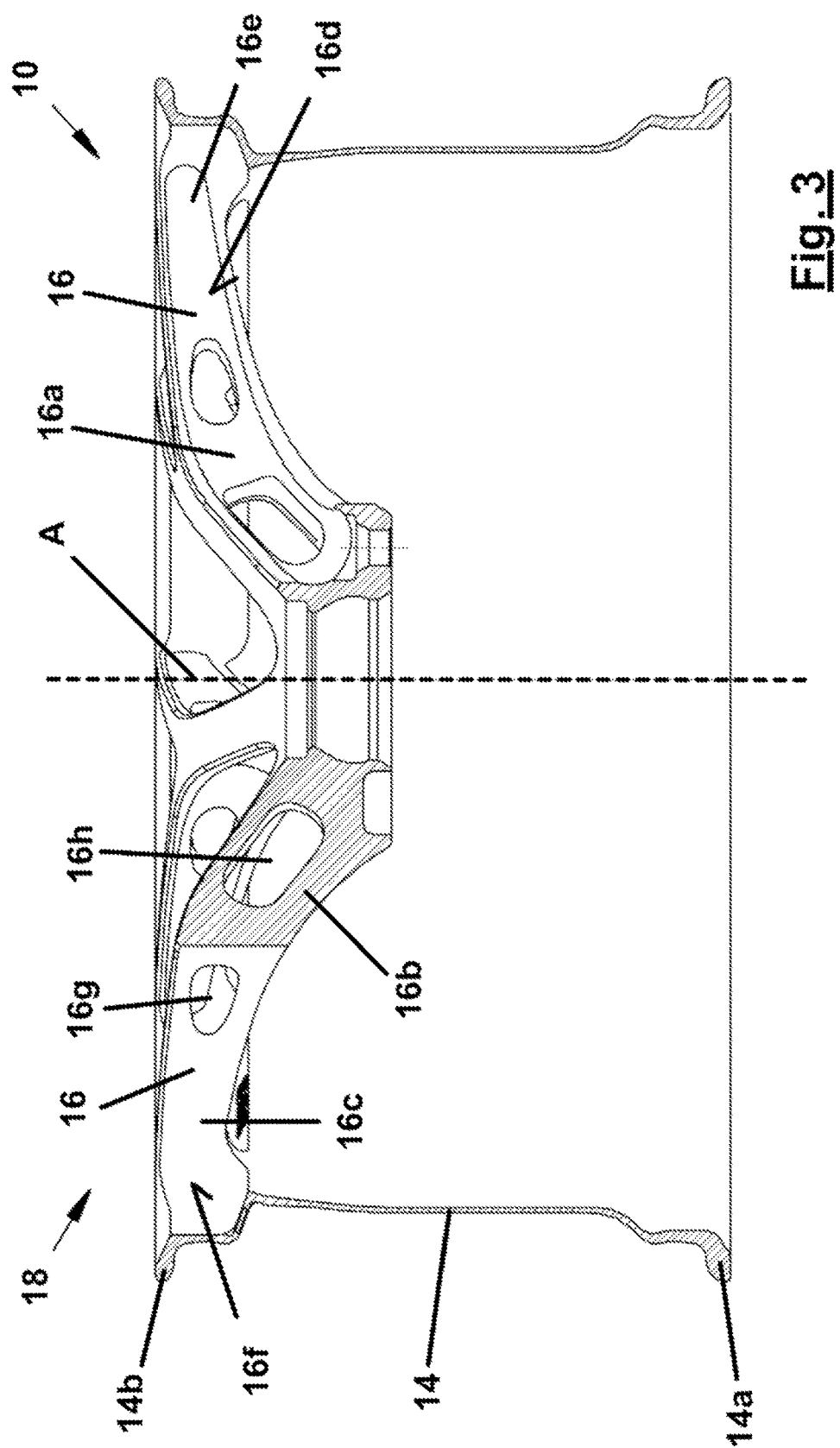
FIG. 3 is a sectional view of the wheel of FIGS. 1 and 2 taken along line III-III in FIG. 2.

In FIGS. 1 to 4, a wheel is designated by reference numeral 10. The wheel 10 has a wheel axis A. Furthermore, the wheel 10 comprises a hub 12, a rim 14 and five Y-shaped spokes 16. The hub 12 and the spokes 16 together form a wheel spider 18 of the wheel 10. In FIGS. 1 and 3, the wheel 10 is shown with its wheel spider side 10a oriented upwards.

The hub 12 of the wheel 10 according to this embodiment may be locked to a wheel carrier (not shown) of a motor vehicle (not shown) by five screw bolt which may be inserted into five corresponding bores 12a provided in the hub 12.

The rim 14 has a rim well 14a and two rim flanges 14b and 14c. The upper or wheel spider side rim flange 14b has an outer diameter D (see FIG. 2)

As already mentioned, the spokes 16 are formed according to a substantial Y-shape having a branch or knot point 16a, a radially inner web 16b extending from the knot point 16a towards the hub 12 and two branch webs 16c extending from the knot point 16a towards the rim 14. The circumferentially outer surfaces 16d of the spokes 16, i.e. the radially inner web 16b and the branch webs 16c, are formed with an undercut 16e, whereas the circumferentially inner surfaces 16f of the two branch webs 16c of the spokes 16 are free of any undercut.

Moreover, through-holes 16g and 16h are formed in the radially inner web 16b and the two branch webs 16c, respectively. These through-holes 16g and 16h, on the one hand, provide a resistance to the flow of heat generated by a breaking action from the hub 12 to the rim 14 and, on the other hand, provides an enlarged contact surface for heat exchange between the wheel 10, in particular the spokes 16, and the ambient air. Both effects contribute to protecting the bead seating 14d and the tire material from overheating.

It should be noted that the through-holes 16g and 16h have a different shape. Whereas the radially inner through-holes 16g are configured according to a substantially rectangular or trapezoidal shape having rounded corners, the radially outer through-holes 16h are configured according to a substantially oval shape.

Figure 4:
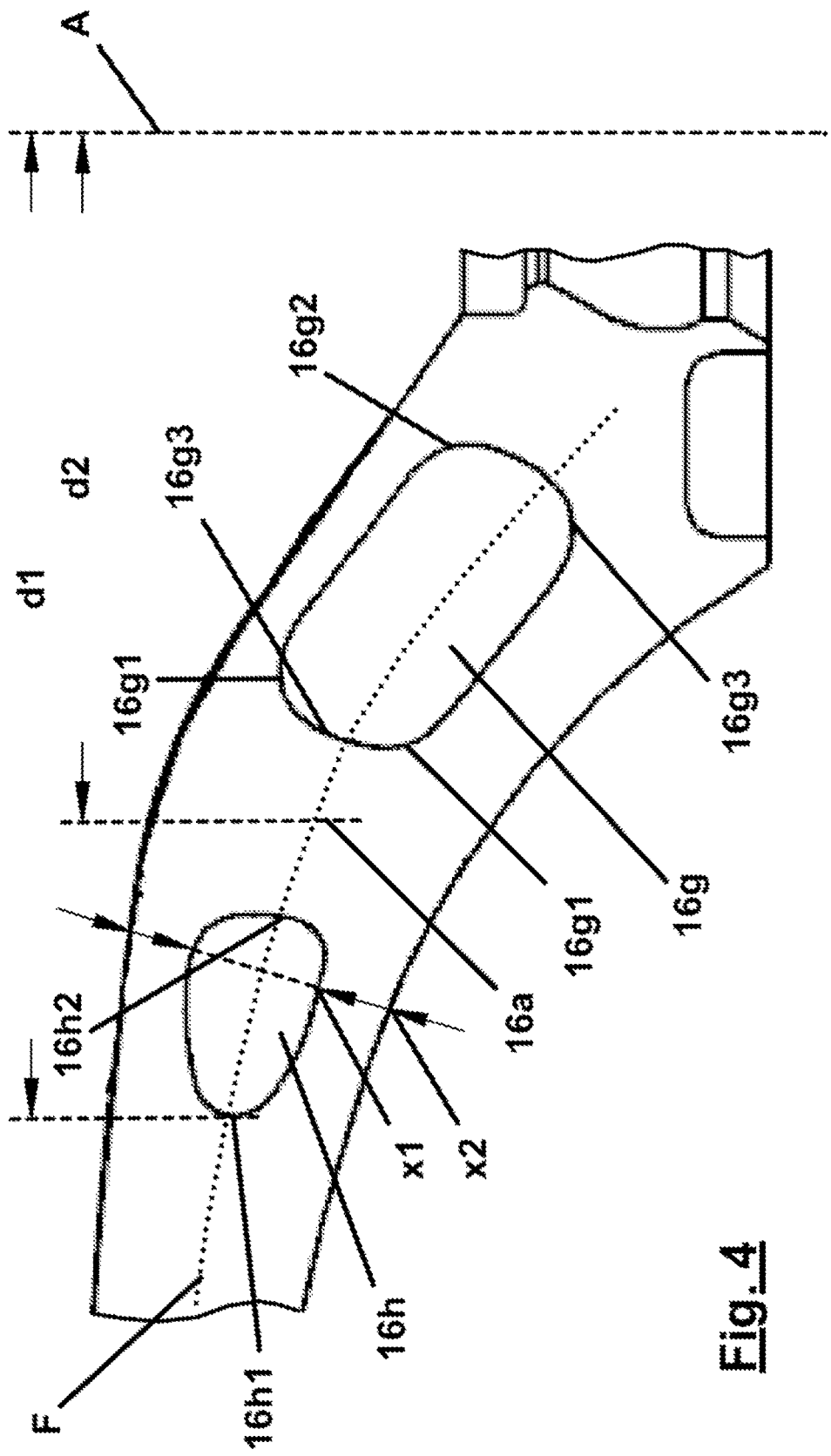
FIG. 4 is an enlarged view of a portion of a spoke of the wheel of FIGS. 1 to 3.

Referring to FIG. 4, the radially outer corners 16g1 and the radially inner corners 16g2 of the radially inner through-holes 16g are rounded independently from each other. Moreover, the radially outer short edge 16g3 of the rectangle is located in close vicinity to the knot point 16a of the Y-shaped spoke 16.

With respect to the radially outer through-holes 16h, it should be noted that the oval shape may have a rounded radially outer edge 16h1 and a rounded radially inner edge 16h2, the radially outer edge 16h1 being narrower than the radially inner edge 16h2, i.e. the tip of the oval form is oriented towards the rim 14. Moreover, the radially outer edge 16h1 is located at a distance d1 from the wheel axis A, which amounts at maximum to about 37.5, preferably at maximum to about ⅓, of the outer diameter D of the rim 12. Furthermore, the radially outer edge 16h1 is located on the neutral fiber F of the corresponding branch web 16c.

Furthermore, the maximum extension x1 of the through-holes 16g and 16h (shown in FIG. 3 only for through-holes 16h) amounts to between about 20% and about 60% of the width x2 of the corresponding web 16b and 16c, respectively, at the place of the maximum extension of the through-hole.

In this context, it should be added that the knot point 16a is located at a distance d2 from the wheel axis A amounting to between about 15% and about 30% of the outer diameter D of the rim 12.

Although in the above-discussed embodiment, all spokes 16 are provided with a radially inner through-hole 16g and two radially outer through-holes 16h, it is also conceivable to design wheels in which at least some of the spokes have a smaller number of through-holes or even no through-holes at all.

Although in the above-discussed embodiment, the wheel 10 is an integrally formed wheel in which the hub 12, the spokes 16 and the rim 14 are integrally formed, it is also conceivable that the wheel is a hybrid wheel in which the wheel spider comprising the hub and the spokes, on the one hand, and the rim, on the other hand, are made from different materials.

Although in the above-discussed embodiment, the wheel 10 is adapted to be locked to a wheel carrier of the motor vehicle by five fastening bolts, it is also conceivable to design wheels which may be locked to the wheel carrier by a different number of fastening bolts, e.g. four fastening bolt, or by a center lock assembly.

Although a wheel for a motor vehicle has been described above in particularly, modifications and alterations will occur to those upon reading and understanding the above description. The invention, however, is not limited to only the embodiments described above. Instead, the invention is broadly defined by the appended claims and the equivalents thereof.

The invention claimed is:

1. A wheel for a motor vehicle, said wheel having a wheel axis and comprising:
   a rim having an outer radius,
   a wheel spider including a radially inner hub and a plurality of spokes extending from said hub towards said rim, and
   at least one through-hole extending, with respect to the wheel axis, in a circumferential direction through at least one of said spokes,
   wherein a radially outermost edge of said at least one through-hole is located at a distance from the wheel axis at maximum of 75% of said outer radius of the rim measured at a wheel spider side of the rim,
   wherein at least one of said plurality of spokes has a branched shape, said branched shape having a knot point and a plurality of webs, at least two webs of the plurality of webs extending from said knot point towards said rim, at least one web of the plurality of webs extending from said knot point towards said hub,
   wherein the at least one through-hole is formed in at least one inner web of the plurality of webs, the at least one inner web extending from said knot point towards said hub, and further including a separate at least one second through-hole formed in at least one outer web of the plurality of webs, the at least one outer web extending from said knot point towards said rim.

2. The wheel of claim 1,
   wherein the branched shape is a Y-shape having the knot point, the plurality of webs including an inner web extending from the knot point towards the hub and two outer webs extending from the knot point towards the rim.

3. The wheel of claim 1,
   wherein the knot point is located at a distance from the wheel axis amounting to between 30% and 60% of the outer radius of the rim.

4. The wheel of claim 1,
   wherein a maximum extension of said at least one through-hole in a direction of the wheel axis amounts to between 20% and 60% of a corresponding extension in the direction of the wheel axis of the at least one spoke at a location of the maximum extension of said at least one through-hole.

5. The wheel of claim 1,
   wherein the at least one through-hole is located along a neutral fiber of the spoke.

6. The wheel of claim 1,
   wherein the at least one through-hole is configured according to a substantially rectangular or trapezoidal shape having rounded corners.

7. The wheel of claim 1,
   wherein the at least one second through-hole is configured according to a substantially oval shape.

8. The wheel of claim 1,
   wherein a surface of at least one spoke of the plurality of spokes facing an adjacent spoke in a circumferential direction with respect to the wheel axis is at least partially formed with an undercut.

9. The wheel of claim 1,
   wherein said hub, said rim and said wheel spider are integrally formed.

10. The wheel of claim 1,
    wherein the wheel is a hybrid wheel, said rim and said wheel spider being made from different materials.

11. The wheel of claim 10,
    wherein the rim is made from fiber-reinforced plastics material.

12. The wheel of claim 10,
    wherein the wheel spider is made from a light metal or a light metal alloy.

13. The wheel of claim 1, wherein the wheel has less than eleven spokes.

14. The wheel of claim 1, wherein the at least one through-hole and the at least one second through-hole have different shapes.

* * * * *